United States Patent [19]

King et al.

[11] Patent Number: 5,768,017

[45] Date of Patent: Jun. 16, 1998

[54] OPTICAL SYSTEM FOR PRODUCING UNIFORM LINE ILLUMINATION

[75] Inventors: Mark Reid King, Milton; Scott Marshall Mansfield, Hopewell Junction, both of N.Y.; William Harry Vonderhaar, Succasunna, N.J.

[73] Assignee: International Business Machines Corporation, Armonk, N.Y.

[21] Appl. No.: 685,421

[22] Filed: Jul. 22, 1996

Related U.S. Application Data

[63] Continuation of Ser. No. 332,003, Oct. 31, 1994, abandoned.

[51] Int. Cl.$^6$ .............................. G02B 27/46; F21V 9/00
[52] U.S. Cl. ................. 359/559; 359/562; 359/558; 362/293
[58] Field of Search ............... 359/558, 559, 359/562; 362/293; 353/20

[56] References Cited

U.S. PATENT DOCUMENTS

| 3,427,104 | 2/1969 | Bukken et al. | 359/559 |
|---|---|---|---|
| 3,592,547 | 7/1971 | Noble | 359/562 |
| 3,719,127 | 3/1973 | Mueller | 359/559 |
| 3,729,252 | 4/1973 | Nelson | 359/559 |
| 4,013,338 | 3/1977 | Sato et al. | 359/559 |
| 4,329,588 | 5/1982 | Barrett et al. | 359/559 |
| 4,724,467 | 2/1988 | Yip et al. | 355/71 |
| 4,735,487 | 4/1988 | Thorwirth et al. | 359/559 |
| 4,811,057 | 3/1989 | Murakami et al. | 355/71 |
| 4,832,446 | 5/1989 | Miyagawa | 359/559 |
| 4,947,413 | 8/1990 | Jewell et al. | 359/559 |
| 5,155,372 | 10/1992 | Bowen et al. | 359/562 |
| 5,288,991 | 2/1994 | King et al. | 250/216 |

FOREIGN PATENT DOCUMENTS 2 238 137  11/1989  United Kingdom .

OTHER PUBLICATIONS

J. M. Geary, "Channel Integrator for Laser Beam Uniformity on Target" Optical Engineering, vol. 27, No. 11, pp. 972–977, Nov. 1988.

F. M. Dickey, "Multifaceted Laser Beam Integrators: general formulation and Design Concepts" Optical Engineering, vol. 27, No. 11, pp. 999–1007, Nov. 1988.

*Primary Examiner*—James Phan
*Assistant Examiner*—Audrey Chang
*Attorney, Agent, or Firm*—H. Daniel Schnurmann

[57] ABSTRACT

A system for creating a bright and uniform line of illumination. The "hot spot" of an arc lamp is imaged onto a narrow, circular pinhole aperture. Light passing through the pinhole aperture is collimated and passed through a second aperture (the apodizing aperture), before being focused to a line of illumination by a cylindrical lens. The spatial profile of the apodizing aperture is tailored to remove non-uniformities in the illumination source thereby allowing a highly uniform line of illumination to be created. Alternatively, the spatial profile of the apodizing aperture can be tailored to produce a line of illumination having a desired non-uniform intensity profile.

12 Claims, 7 Drawing Sheets

OPTICAL SYSTEM FOR PRODUCING UNIFORM LINE ILLUMINATION

This application is a continuation of application Ser. No. 08/332,003, filed Oct. 31, 1994, abandoned.

FIELD OF THE INVENTION

This invention relates to an optical inspection system and more particularly to an improved system for producing uniform line illumination.

BACKGROUND OF THE INVENTION

Via openings have been routinely used in the design and manufacture of substrate sheets to provide interconnections between conductive lines positioned in different ceramic substrate sheets. These sheets are ultimately used to form a multi-layer module to provide a substrate to one or more integrated chips mounted on them. During the process of sintering the sheets together, distortions in the location of the vias introduce misalignments between the conductive paths and the vias, that lead to a defective substrate. Similar distortions also occur in thin-films within which are deposited conducting lines and vias and which are placed on top of a ceramic sheet.

These and other considerations make it essential to make provisions for an inspection system that has an illumination source highly sensitive to the very small dimensions and tight spacing of the vias, thereby providing image contrast to the optical characteristics of the sheet under inspection.

Producing a uniform line of illumination for line-scan inspection has traditionally been quite difficult using current techniques. As previously mentioned, for inspecting features on packaging substrates, bright, uniform light is essential. Since line-scan cameras typically have very short integration times (usually, less than 1 millisecond) when compared with standard full field cameras (of the order of 0.5 seconds), the strip on the sample that is to be imaged must be brightly illuminated to provide an adequate signal. Because the image is acquired by continuous scanning rather than by a step and repeat operation, the inspection time is directly proportional to the intensity available to the image. Thus, high brightness illumination is essential to achieve high throughput. Additionally, the illumination must be highly uniform. This requirement arises from the fact that non uniform illumination produces artificially induced areas of low reflectance in the image that do not correspond to real features.

Producing high contrast images of features necessitates the use of very bright, uniform illumination. The reflectance of metal vias on ceramic substrates is lowered by oxidation. Their composite nature also makes them difficult to image, in view of their "speckled" appearance. To achieve the required brightness, arc lamp sources must be used, wherein the circular arc must be converted into a line of light. The prevalent non-uniformity of arc lamp sources coupled to the circular shape of most optical components creates a challenge to achieve adequate uniformity.

Several methods have been used to date to address the aforementioned problem. The simplest technique is to expand the illumination light into a circular spot which is larger than the line to be illuminated. A narrow rectangular aperture is placed across this spot, thereby creating near uniform illumination. The method relies on spreading non-uniformities over a large area. This method is highly inefficient since most light is vignetted by the narrow aperture.

King, et al. in U.S. Pat. No. 5,288,991, of common assignee, describe a line illumination system that uses a circular to rectangular bundle of fibers coupled to a channel integrator to homogenize the illuminated line. The system described achieves uniformities in the order of 80–85%.

The use of channel integrators is well known in the art and has been extensively described in the literature, such as in an article by J. M. Geary, entitled "Channel integrator for laser beam uniformity on target", published in Optical Engineering, November 1988, Vol. 27, No. 11, pp. 972–977, and in a second article by F. M. Dickey et al., "Multifaceted laser beam integrators: general formulation and design concepts", likewise published in Optical Engineering of November 1988, Vol. 27, No. 11, pp. 999–1007. Channel integrators are custom designed and must be manufactured to tight tolerances due to the parallelism of the faces. Additionally, they are difficult to properly align.

In many critical applications, particularly those wherein the contrast of the features on the substrate is low, illumination uniformity of at least 95% is required, a requirement beyond the reach of present day techniques.

OBJECTS OF THE INVENTION

Accordingly, it is a primary object of the present invention to provide a system that creates bright, uniform line illumination.

It is still another object of the present invention to provide an illumination system which uses a shaped aperture to compensate for non-uniformities in the illumination source.

It is yet another object of the present invention to provide a line illumination scheme that can be used in any imaging system that uses an incoherent source and a linear detector for imaging, such as a line scan camera and the like.

It is a more particular object of the present invention to provide a system that can be used for both measurement and inspection and which is not restricted to electronic package applications.

SUMMARY OF THE INVENTION

Briefly, this invention contemplates the provision of an illumination system comprising: a source of light transmitting radiation along a longitudinal axis; intensity modulation means positioned along the longitudinal axis and intercepting a portion of the transmitted radiation for modulating the intensity of the radiation along a first transverse axis, wherein an amount of the radiation passing parallel to the longitudinal axis at an offset distance from the longitudinal axis along the transverse axis varies as a function of the offset distance to provide a tailored intensity profile; and optical means for converting the radiation transmitted by the source of light and passing through the intensity modulating means into a line of illumination having the tailored intensity profile.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
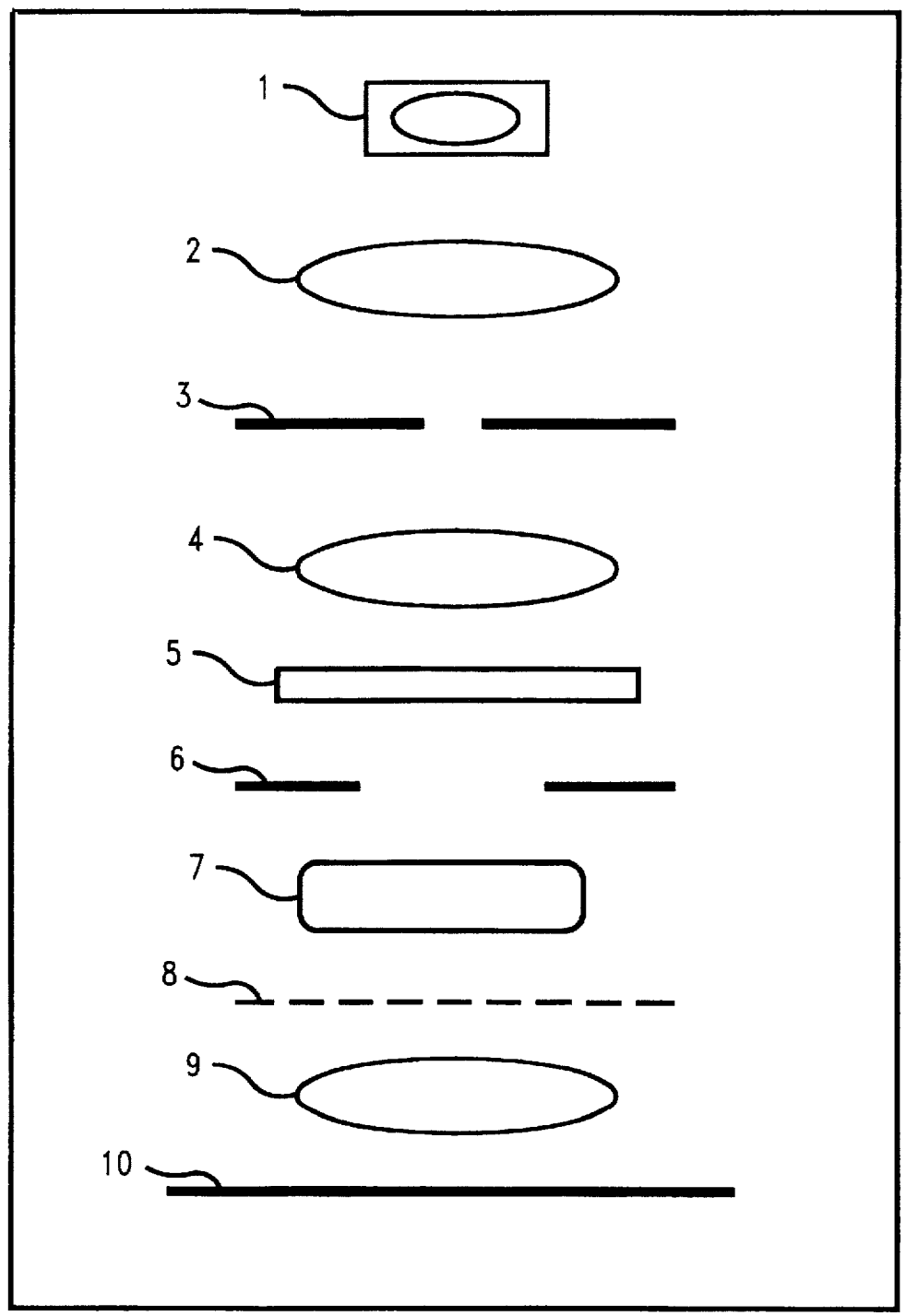
FIG. 1 is a schematic diagram of the optical system for line illumination according to the present invention.

Referring to FIG. 1, an arc lamp 1 is shown as a source of illumination. Arc lamps are typically non-uniform, incoherent, broad band sources of light with more light emanating from the volume close to the electrodes than from the volume midway between the electrodes. Typical sources of light used include: mercury (Hg), mercury-xenon (Hg—Xe), and the like, although sources of other nature may also be used. A "hot spot" of the lamp is imaged by a condenser lens 2 which is placed in close proximity of the lamp (typically 25–50 mms depending on the focal length of the condenser and the desired magnification) and is set to collect as much light emerging from the light source as possible while refocusing this light to the plane of a pinhole aperture 3. The aperture 3 acts as a spatial filter that removes the light emanating from an area of the arc lamp that is sufficiently removed from the desired "hot spot". Typically, the pinhole aperture is placed in the image plane of the "hot spot" created by the condenser. The pinhole then appears to be a nearly uniform source of light. There is a trade off between the uniformity of the light passing through the pinhole (to be referred to herein after as the uniformity of the light source) and the amount of light passing through the pinhole (to be referred to hereinafter as the brightness of the light source). The size of this pinhole aperture, along with the magnification of the arc lamp by the condenser lens 2, can be varied to adjust the uniformity and brightness of the light source. Typically, the condenser magnification will be close to unity and the pinhole size will be chosen to be close to the size of the "hot spot". By means of an example, if the magnification of the condenser lens is 1, then the pinhole is placed at the same distance from the condenser as the condenser is positioned with respect to the arc lamp.

The light emanating from the pinhole is collimated using a collimating lens 4, such that light diverging from the pinhole aperture is converted into a parallel set of light rays. This is achieved by placing the aperture at or approximately at the focus of the collimating lens. Although not essential to the present invention, it has been found advantageous to place polarizing optics and/or filters 5 before passing through the apodizing aperture 6 and cylindrical lens 7. When trying to image samples of low contrast, it is often necessary to tailor the illumination to improve the contrast. This can be accomplished by adjusting the wavelength of the illumination (color) by using filters for features that reflect certain wavelengths better than others. It can also be accomplished by polarizing the illumination using polarizing optics and using a crossed polarizer in the imaging optics to better image objects that tend to scatter light rather than reflect it. This has proven to be helpful in locating defects or extraneous materials in an inspection system. Since polarizing optics and filters are most effective on collimated light, and since lens 4 has collimated the illumination, the polarizing optics and/or filters 5 may be placed at any position between collimating lens 4 and cylindrical lens 7.

The effect of apodizing aperture 6 is different from the pinhole aperture 3 because these apertures fall on different planes in the optical system. The pinhole aperture 3 falls on an image plane of the arc lamp where the arc lamp is in focus and is used to tailor the spatial profile of the arc lamp. The apodizing aperture falls on a plane where the light from the arc lamp is collimated and is therefore completely out of focus. If the pinhole aperture is made smaller, the illumination at the apodizing aperture will not get smaller in spatial extent, but will instead become less bright. Additional characteristics of the apodizing aperture 6 will be further explained hereinafter.

The cylindrical lens 7 is used to focus the collimated beam of light to a line in one transverse direction and to a point in the other at the focal plane of the cylindrical lens 7. The line of illumination can now be imaged using the objective lens 9 onto the object 10 to be illuminated. The apodizing aperture tailors the profile of the beam that impinges on the cylindrical lens 7. This aperture can tailor the spatial profile or the intensity profile of the beam. Whereas the spatial profile will, hereinafter, be assumed to be tailored by the apodizing aperture, it will become readily apparent to practitioners of the art that other methods, such as tailoring the intensity profile, could be advantageously used. By customizing the profile of the beam that impinges on the cylindrical lens, the intensity profile along the line of light created by the cylindrical lens 7 can be adjusted and, more specifically, made uniformly bright.

Figure 2:
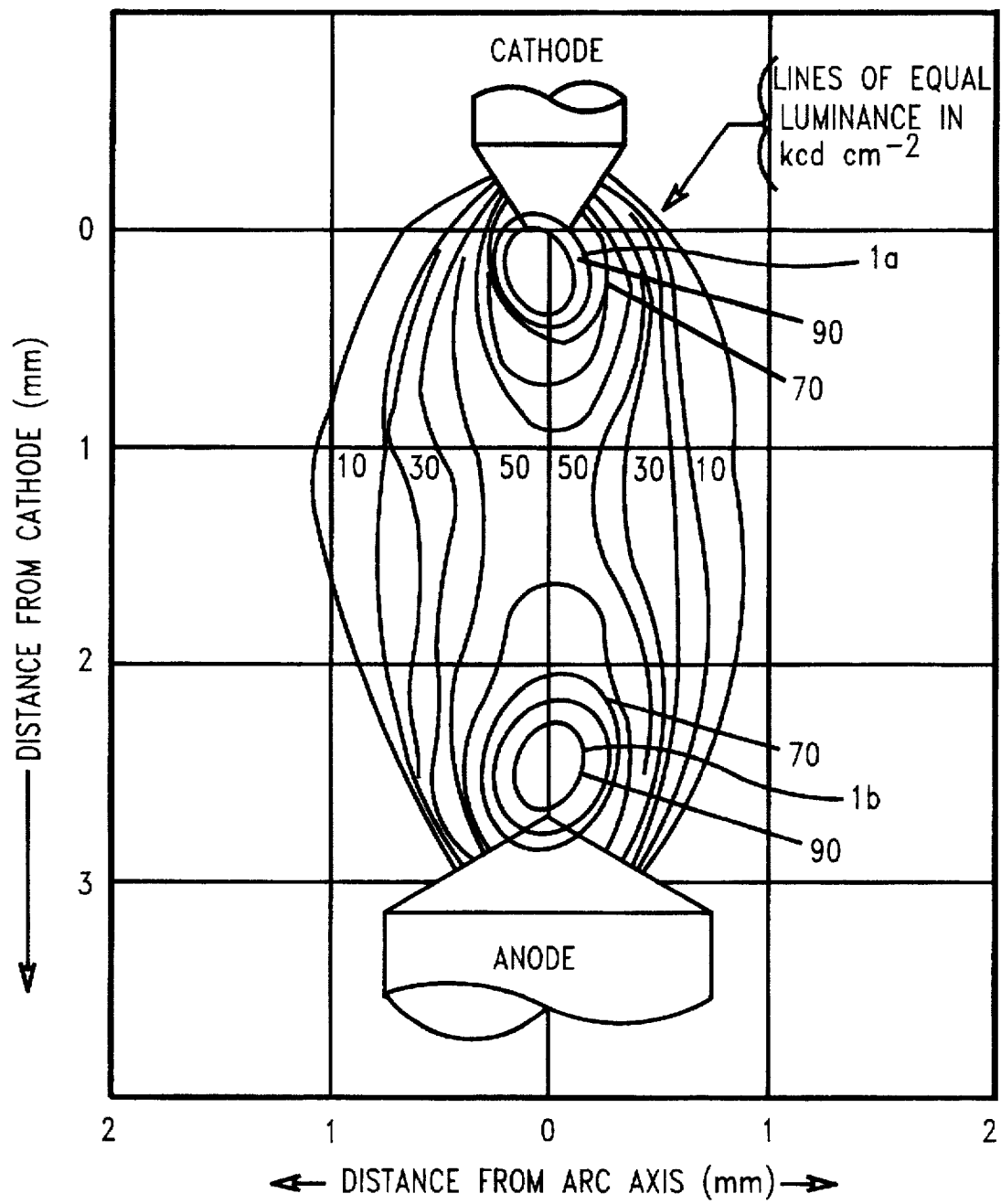
FIG. 2 shows a typical contour map of a state of the art mercury arc lamp.

Referring now to FIG. 2, it is shown a typical intensity profile of an Hg arc lamp known to the art. Similar contour maps of a mercury or xenon arc lamps can be found in the publication by ORIEL Corporation of Stratford, Conn., "Light Sources, Monochromators, Detection Systems", Vol. II, (1989) page 88, 1989. Areas of high illumination intensity, also referred to as "hot spots", are present both at the anode and at the cathode of the lamp. In outlying areas further removed from the "hot spots" 1a and 1b, there is indication of the presence of an illumination profile characterized by severe non-uniformity. Lines of equal luminance, shown as numerals ranging from 10 to 90 (kcd cm$^{-3}$) highlight that most of the light emitted by the lamp is concentrated in those "hot spots". Thus, a properly sized pinhole will eliminate the non-uniformity by suitably blocking the areas surrounding the "hot spots".

FIGS. 3–7 show, respectively, the effect of the apodizing aperture 6. More specifically, referring to FIG. 1 as it applies to FIGS. 3 and 4, the pinhole aperture 3 is assumed to have infinitesimally small dimensions and a uniform brightness. In this case, the optical elements 2–6 placed between the pinhole and the cylindrical lens 7 introduce no appreciable changes to the intensity profile, namely, no vignetting, scattering, absorption and the like. Alternatively, referring to FIG. 1 as it applies to FIGS. 5 and 6, the pinhole aperture 3 is considered to have a finite size. Herein, the light across the pinhole is not uniformly bright due to non-uniformity within the arc lamp "hot spot", as was previously described. In this case, the assumption that the elements 2–6 do not change the intensity profile is no longer required. In all cases shown in FIGS. 3–7, it is assumed that the spatial extent of the illumination at the plane of the cylindrical lens 7 falls completely within the clear aperture of the lens. If this were not the case, the lens itself would act as an aperture. Since the effects of the lens and the aperture will be better understood by treating them as separate entities, this latter alternative will be considered, although practitioners of the art will readily appreciate that this assumption is neither required nor essential for the proper functioning of the present invention.

Figure 3:
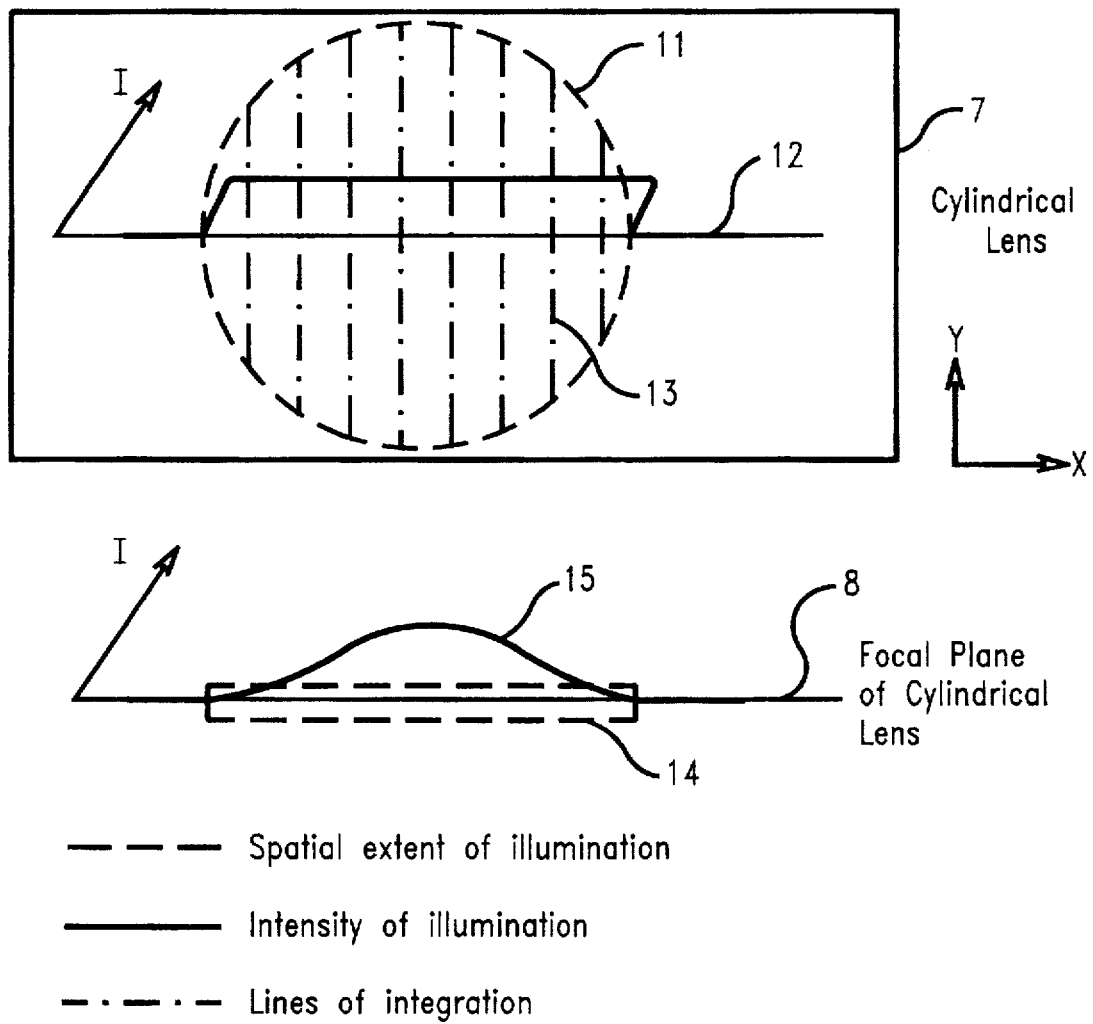
FIG. 3 shows intensity profiles both at the plane of the cylindrical lens and at the focal plane of the cylindrical lens in the absence of an aperture, assuming a uniform illumination source.

In FIG. 3, the face of the cylindrical lens 7 is drawn along with the intensity profile of the light incident upon the lens from the illumination source 1 and optical elements 2–6 (in FIG. 1). The spatial extent of the incident illumination 11 corresponds to the area on the cylindrical lens 7 that has some light shining on it, as determined using normal ray optics and ignoring diffraction effects. Under the conditions described above, the illumination intensity 12 is uniformly bright within the spatial extent of the illumination 11 and uniformly dark outside the spatial extent. By focusing the light to a line of illumination, the cylindrical lens 7 will integrate the intensity of the light along lines 13 parallel to its focusing axis (y axis in FIG. 3). The intensity profile of the line of light 15 will be, in this case, highly non-uniform due to a larger integration length in the center of the line compared to that at the edges of the line of illumination. The spatial extent of the line of illumination 14 will, in general, be determined by the size of the pinhole aperture 3 (in FIG. 1), the apodizing aperture 6 (in FIG. 1) and diffraction effects.

Figure 4:
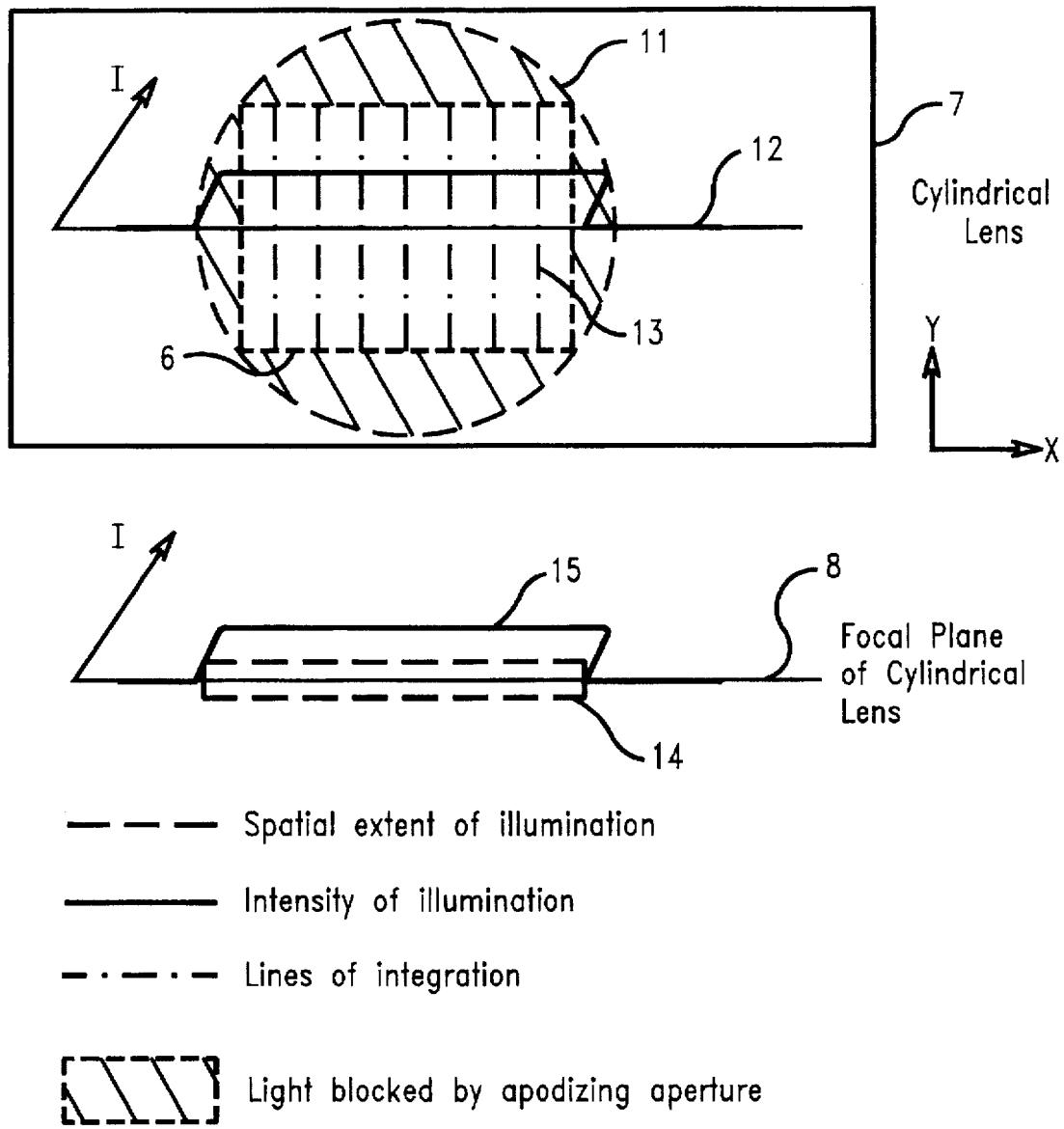
FIG. 4 shows intensity profiles analogous to FIG. 3 in the presence of a rectangular aperture, assuming a uniform illumination source.

This effect can be seen and better understood by referring to FIG. 4, wherein a system, equivalent to that shown in FIG. 3, includes, in addition the apodizing aperture 6. To function properly, it would be advantageous for the apodizing aperture 6 to be fully contained within the spatial extent of the illumination 12. As may be seen, the rectangular aperture results in lines of integration 13 that are all of equal length, and since the incident illumination intensity 12 is uniform, the intensity of the light 15 created by cylindrical lens 7 is uniformly bright inside its spatial extent 14, and uniformly dark profile outside its spatial extent 14.

Figure 5:
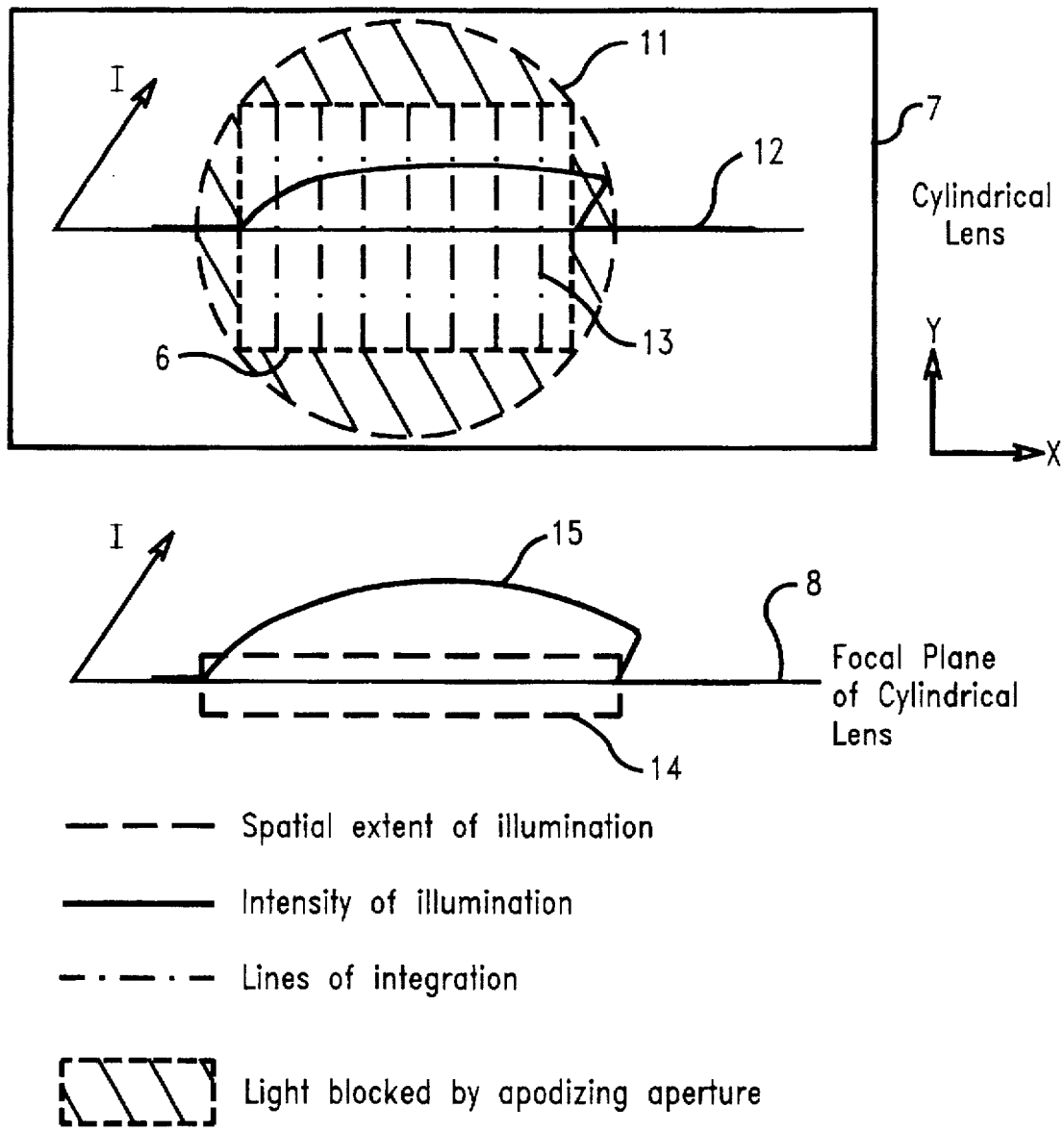
FIG. 5 shows intensity profiles analogous to FIG. 4 in the presence of a rectangular aperture and assuming a non-uniform illumination source.

The embodiment shown in FIG. 4, however, is not realistic in practice. Referring to FIG. 1 as it applies to FIG. 4, a pinhole aperture 3 that is small enough to give the necessary uniformity, typically, would not allow sufficient light to pass through it to sufficiently illuminate the object of interest 10. The pinhole 3 is, therefore, routinely made larger to allow more light to pass through it, although the brightness of light passing through the pinhole 3 is not uniform across the entire pinhole. This effect is illustrated in FIG. 5, where again the system shown is equivalent to that of FIG. 4 except that the pinhole aperture 3 is no longer assumed to be infinitesimally small, and optical elements 2–6 are allowed to introduce changes in the illumination intensity profile. The illumination profile 12 at the cylindrical lens is now no longer uniform within the spatial extent of the illumination 11, but shows that the light is typically brighter towards the center of its spatial extent than it is towards its edges. Any non-uniformity in the incident intensity profile will result in an intensity profile of the line of light 15 to be non-uniform. A situation could be envisioned where the illumination profile at the cylindrical lens is brighter toward the edges than at the center. This could be the case, for instance, if the collimating lens were made out of a semi-transparent material. In FIG. 5, the intensity profile of the incident illumination is assumed to be brighter towards the center of its spatial extent. However, practitioners of the art will fully realize that other various conditions could exist and result in a different non-uniform intensity profile for the line of illumination.

Figure 6:
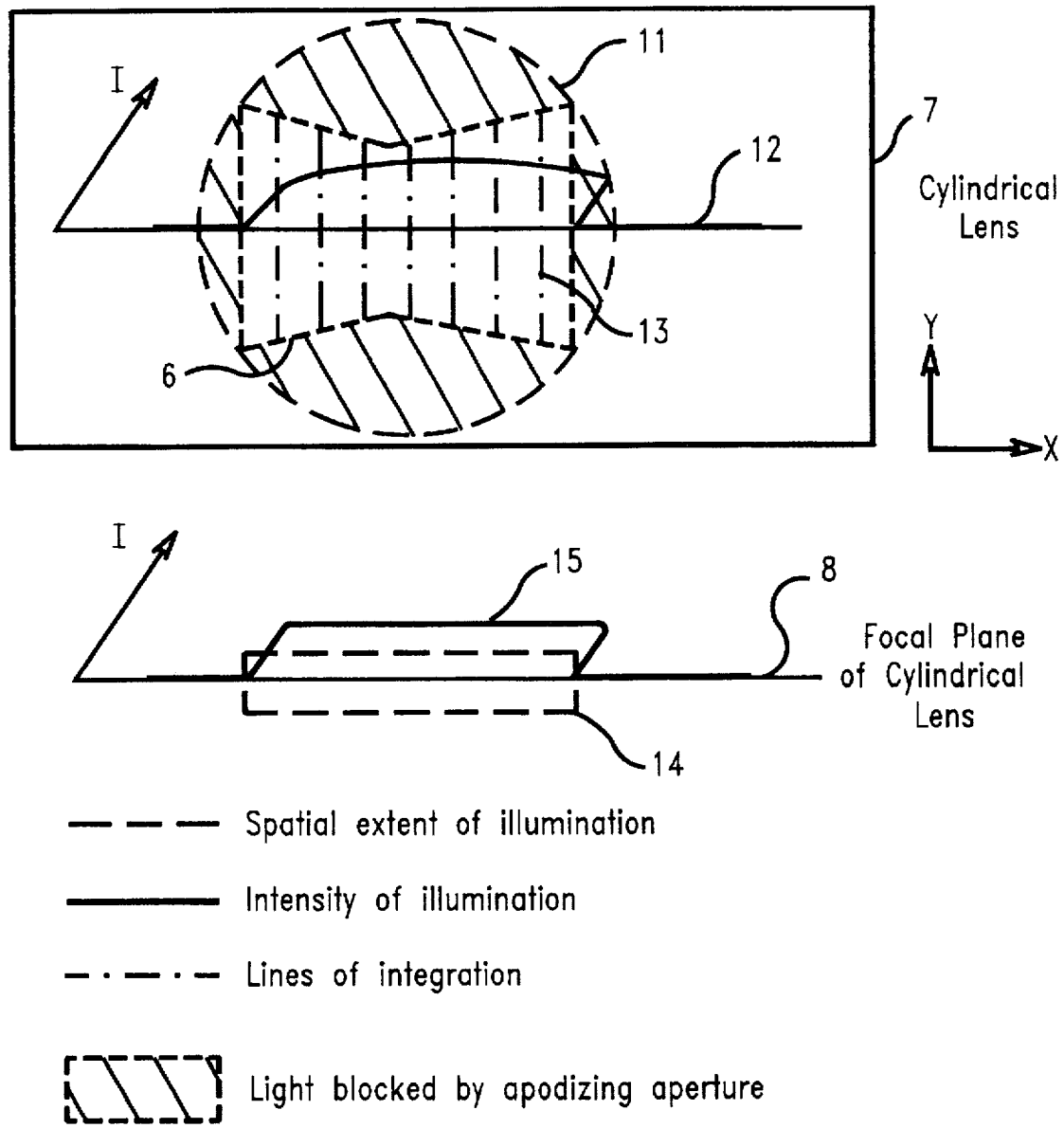
FIG. 6 shows intensity profiles analogous to FIG. 4 in the presence of a customized aperture to improve uniformity from a non-uniform illumination source.

To correct for the non-uniformity in the incident illumination profile, the shape of the apodizing aperture 6 is tailored. In FIG. 6, the same conditions as those prevailing in FIG. 5 exist, except that the shape of the apodizing aperture has been extensively tailored to correct non-uniformities in the illumination. Herein, the incident illumination intensity 12 is assumed to be brighter at the center of its spatial extent 11 compared with that at the edges. Shortened integration lengths at the center are meant to correct for this differences. With the correct aperture shape, the intensity of the line of illumination 15 can be made uniform across its entire spatial extent 14. The necessary shape of the aperture can be predicted theoretically using simple ray tracing techniques or determined experimentally by measuring the intensity profile of the incident illumination 12 at the cylindrical lens 7.

By comparing FIGS. 4 and 6, it can be seen that there exists a trade off between the spatial filtering of the illumination by the pinhole aperture and the apodizing aperture. As the pinhole is made smaller, the apodizing aperture can be made more rectangular. Alternatively, by making the pinhole larger, the apodizing aperture requires removing more and more light from the center of the profile. Keeping the pinhole larger will still typically result in a brighter line intensity profile, since making the pinhole smaller decreases the intensity across the entire spot. Increasing the filtering of the apodizing aperture only removes light from the brightest points in the profile while leaving the dimmer points essentially unchanged. With careful design of the apodizing aperture, a pinhole aperture may not be necessary. However, by keeping the pinhole aperture 3 small enough such that the intensity profile across it is symmetric (but non-uniform), the design and construction of the apodizing aperture becomes more straightforward.

Figure 7:
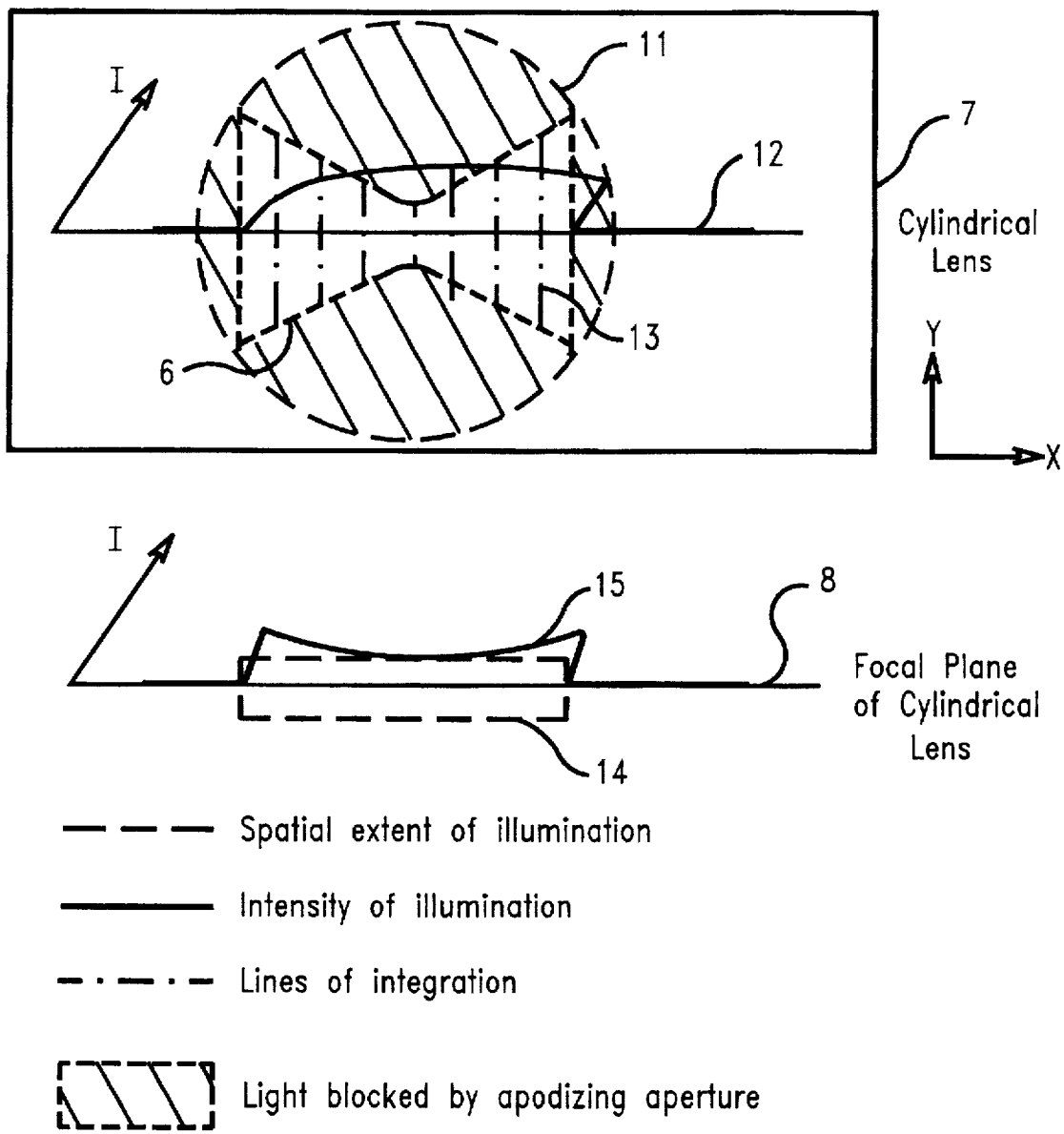
FIG. 7 shows intensity profiles analogous to FIG. 4 in the presence of a customized aperture to tailor the line illumination to a desired profile from a non-uniform illumination source.

While FIGS. 3–6 have taught how to create a uniform line of illumination, this concept could be applied equally well to create a line of illumination with any desired intensity profile. This is shown in FIG. 7, wherein the apodizing aperture 6 is designed so that the intensity of the line illumination 15 is tailored to be brighter at the edges of its spatial extent 11 than towards the center.

While the invention has been described in terms of a single preferred embodiment, those skilled in the art will recognize that the invention can be practiced with modifications within the spirit and scope of the appended claims.

What is claimed is:

1. An illumination system for improving the intensity distribution of a light beam comprising:

a spatially incoherent source of light transmitting radiation along a longitudinal axis;

a lens for collimating said radiation, said collimated light having a non-uniform first intensity profile of said radiation along a first-transverse axis;

an aperture positioned along said longitudinal axis and intercepting a portion of said collimated radiation for modulating the intensity of said radiation along said first transverse axis and along a second transverse axis, said aperture having a shape that is tailored to provide a second intensity profile of said radiation, said shape allowing more light to pass through the edges of said aperture along said first transverse axis than the light passing through the center of said aperture; and a cylindrical lens positioned adjacent and in close proximity to said aperture having a focusing dimension along said second transverse axis, wherein the distance between said cylindrical lens and said aperture is substantially less than the focal length of said cylindrical lens, said cylindrical lens converting said radiation passing through said aperture into a line of illumination extending parallel to said first transverse axis and having a uniform third intensity profile along said first transverse axis.

2. The illumination system as recited in claim 1, wherein said source of light is essentially spherical.

3. The illumination system as recited in claim 1, wherein said source of light is an arc lamp.

4. The illumination system as recited in claim 3, wherein said radiation transmitted from said arc lamp emanates from a "hot spot" within said arc lamp.

5. The illumination system as recited in claim 1, wherein an amount of said radiation passing parallel to said longitudinal axis at an offset distance from said longitudinal axis along said first transverse axis varies as a function of said offset distance to provide said second profile, the height of said aperture being an increasing function of said offset distance.

6. The illumination system as recited in claim 1, further comprising:

condensing optical means positioned along said longitudinal axis and optically coupled to said source of light for condensing radiation transmitted by said source of light;

second aperture positioned along said longitudinal axis for reducing said condensed radiation to a pinhole size.

7. The illumination system as recited in claim 6, wherein said condensing optical means is a condenser lens.

8. The illumination system as recited in claim 6, further comprising optical filtering means for polarizing said collimated radiation.

9. The illumination system as recited in claim 6, further comprising optical filtering means for transmitting selected wavelengths of radiation.

10. The illumination system as recited in claim 6, further comprising:

first optical filtering means for polarizing said collimated radiation; and second optical means for transmitting selected wavelengths of radiation.

11. The illumination system as recited in claim 1, further comprising an objective lens positioned along said longitudinal axis for imaging said line of illumination onto an object to be illuminated.

12. An illumination system for improving the intensity distribution of a light beam comprising:

a spatially incoherent source of light transmitting radiation along a longitudinal axis;

a lens for collimating said radiation, said collimated light having a non-uniform first intensity profile of said radiation along a first transverse axis;

an intensity modulation means positioned along said longitudinal axis and intercepting a portion of said collimated radiation for modulating the intensity of said radiation along said first transverse axis and along a second transverse axis, said intensity modulation means having a transmission profile that is tailored to provide a second intensity profile of said radiation, said transmission profile allowing more light to pass through the edges of said intensity modulation means along said first transverse axis than the light passing through the center of said intensity modulation means; and a cylindrical lens positioned adjacent and in close proximity to said intensity modulation means having a focusing dimension along said second transverse axis, wherein the distance between said cylindrical lens and said intensity modulation means is substantially less than the focal length of said cylindrical lens, said cylindrical lens converting said radiation passing through said intensity modulation means into a line of illumination extending parallel to said first transverse axis and having a uniform third intensity profile along said first transverse axis.

* * * * *